(12) United States Patent
Chace et al.

(10) Patent No.: US 8,964,504 B2
(45) Date of Patent: Feb. 24, 2015

(54) METHOD AND APPARATUS FOR EVALUATING A CEMENTED BOREHOLE CASING

(75) Inventors: David M. Chace, Houston, TX (US); Rafay Z. Ansari, Spring, TX (US); Elton Frost, Jr., Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 595 days.

(21) Appl. No.: 13/079,303

(22) Filed: Apr. 4, 2011

(65) Prior Publication Data

US 2012/0075953 A1 Mar. 29, 2012

Related U.S. Application Data

(60) Provisional application No. 61/321,637, filed on Apr. 7, 2010.

(51) Int. Cl.
*G01V 1/50* (2006.01)
*G01V 5/10* (2006.01)
*E21B 47/00* (2012.01)

(52) U.S. Cl.
CPC ............ *G01V 5/101* (2013.01); *E21B 47/0005* (2013.01)
USPC .................... 367/35; 250/269.6; 250/269.4

(58) Field of Classification Search
CPC ............................ E21B 47/0005; G01V 5/101
USPC ............... 73/152.17, 152.14, 152.16, 152.31, 73/152.51, 588, 600; 166/253.1, 285, 166/254.2; 175/4.51, 50; 181/104, 105; 250/259, 260, 266, 269.5, 269.6, 301, 250/303, 255, 264, 356.1, 265, 269.7; 367/28, 33, 35, 86, 911, 912; 324/333; 376/118, 166
See application file for complete search history.

(56) References Cited

U.S. PATENT DOCUMENTS

| | | | | |
|---|---|---|---|---|
| 3,691,518 | A | * | 9/1972 | Schuster ........................ 367/28 |
| 3,780,301 | A | * | 12/1973 | Smith et al. ................... 250/301 |
| 3,815,677 | A | * | 6/1974 | Pennebaker, Jr. .......... 166/253.1 |
| 4,028,546 | A | * | 6/1977 | Peelman et al. .............. 376/166 |
| 4,092,536 | A | | 5/1978 | Smith |
| 4,796,237 | A | | 1/1989 | Hutchens et al. |

(Continued)

FOREIGN PATENT DOCUMENTS

WO 2006116299 A2 11/2006

OTHER PUBLICATIONS

"Neutron porosity," Schlumberger Oilfield Glossary, downloaded Jun. 22, 2013 from http://www.glossary.oilfield.slb.com/en/Terms/n/neutron_porosity.aspx.*

(Continued)

*Primary Examiner* — Daniel L Murphy
(74) *Attorney, Agent, or Firm* — Cantor Colburn LLP (57) ABSTRACT

A method of evaluating a cased borehole in an earth formation includes: emitting at least one acoustic signal into the borehole via an acoustic source and detecting a return acoustic signal via an acoustic sensor, the borehole including a casing and a casing support material disposed between the casing and a borehole wall; emitting a neutron flux via a neutron source into the borehole and detecting a radiation signal via a radiation detector, the radiation signal including induced gamma radiation resulting from neutron interactions; and identifying a casing support material characteristic based on the return acoustic signal and the radiation signal.

20 Claims, 6 Drawing Sheets

(56) References Cited

U.S. PATENT DOCUMENTS

| | | | |
|---|---|---|---|
| 4,990,774 A * | 2/1991 | Smith et al. | 250/269.5 |
| 5,001,342 A * | 3/1991 | Rambow | 250/260 |
| 5,406,078 A | 4/1995 | Jacobson | |
| 5,461,909 A * | 10/1995 | Arnold | 73/152.14 |
| 5,841,734 A * | 11/1998 | Ritter et al. | 367/35 |
| 6,173,606 B1 * | 1/2001 | Mosley | 73/152.16 |
| 2008/0112262 A1 | 5/2008 | Tang et al. | |
| 2009/0086575 A1 | 4/2009 | Tello et al. | |

OTHER PUBLICATIONS

"Neutron log," Schlumberger Oilfield Glossary, downloaded Jun. 22, 2013 from http://www.glossary.oilfield.slb.com/en/Terms/n/neutron_log.aspx.*

"Sonic log," Schlumberger Oilfield Glossary, downloaded Jun. 22, 2013 from http://www.glossary.oilfield.slb.com/en/Terms/s/sonic_log.aspx.*

Baker Hughes, "Real-Time Fiber-Optic Casing Imager System." Jul. 2009.

Robins, N.S. and A.E. Milodowski. "Borehold Cements and the Downhole Environment—a Review," Quarterly Journal of Engineering Geology, London, 1986, vol. 19, pp. 175-181.

Baker Hughes Service Overview, "Drilling, Completion and Mechanical Cement Evaluation." [www.bakerhughesdirect.com] Jan. 26, 2010.

Notification of Transmittal of the International Search Report and the Written Opinion of the International Searching Authority, or the Declaration; PCT/US2011/031403; Dec. 26, 2011.

* cited by examiner

METHOD AND APPARATUS FOR EVALUATING A CEMENTED BOREHOLE CASING

CROSS REFERENCE TO RELATED APPLICATIONS

This application claims the benefit of an earlier filing date from U.S. Provisional Application Ser. No. 61/321,637 filed Apr. 7, 2010, the entire disclosure of which is incorporated herein by reference.

BACKGROUND

Downhole production boreholes utilized in subterranean operations typically utilize casings disposed therein to protect the borehole from downhole pressures, chemical reactions and other conditions and prevent failures such as borehole collapse, burst and tensile failures. Casings can also be used to define production zones in various portions of the borehole.

Casing monitoring and evaluation techniques are important tools in maintaining the integrity of the casing, and in turn maintaining the integrity of the borehole. Typical evaluation and maintenance procedures involve interrogating the casing and cement that is used to bond the casing to a borehole wall to determine whether voids are present between the casing and the borehole wall.

Typical methods for detecting voids include interrogating the casing and cement with acoustic signals to detect micro annuluses and other openings formed between the casing and the borehole wall. Detected microannuluses are typically corrected via methods such as applying hydrostatic pressure to the interior of the casing. Such detection methods can be inefficient and inaccurate in that they may be unable to effectively differentiate between an insignificant microannulus and a true void between the casing and the cement that can compromise the hydraulic seal formed therebetween.

SUMMARY

A method of evaluating a cased borehole in an earth formation includes: emitting at least one acoustic signal into the borehole via an acoustic source and detecting a return acoustic signal via an acoustic sensor, the borehole including a casing and a casing support material disposed between the casing and a borehole wall; emitting a neutron flux via a neutron source into the borehole and detecting a radiation signal via a radiation detector, the radiation signal including induced gamma radiation resulting from neutron interactions; and identifying a casing support material characteristic based on the return acoustic signal and the radiation signal.

A method of evaluating a cased borehole in an earth formation includes: disposing an acoustic measurement device in the cased borehole, the borehole including a casing and a casing support material disposed between the casing and a borehole wall, the acoustic measurement device including at least one acoustic source and at least one acoustic receiver; emitting an acoustic signal into the borehole at a plurality of locations and detecting a return acoustic signal at each of the plurality of locations; generating an acoustic log that includes a plurality of return signal amplitudes, each return signal amplitude correlated with a respective location; identifying a gap location in the casing support material by comparing at least one of an amplitude and an attenuation of each return signal amplitude to a reference value; disposing a neutron measurement device in the cased borehole, the neutron measurement device including at least one neutron source and at least one gamma ray detector; emitting a neutron flux into the borehole at the plurality of locations and detecting a radiation signal at each of the plurality of locations, the radiation signal including induced gamma radiation resulting from neutron interactions; generating a neutron log that includes a plurality of radiation counts, each radiation count corresponding to a constituent concentration at each of the plurality of locations; determining the radiation count at the gap location and comparing the radiation count at the gap location to a reference radiation count; and identifying whether the gap is a void based on the comparison.

An apparatus for evaluating a cased borehole in an earth formation includes: an acoustic measurement device configured to be disposed in the cased borehole and including at least one acoustic source configured to emit at least one acoustic signal into the borehole and at least one acoustic sensor configured to detect a return acoustic signal, the borehole including a casing and a casing support material disposed between the casing and a borehole wall; a neutron measurement device configured to be disposed in the cased borehole and including at least one neutron source configured to emit a neutron flux into the borehole and at least one radiation detector configured to detect a radiation signal, the radiation signal including induced gamma radiation resulting from neutron interactions; and at least one processor configured to receive the at least one return acoustic signal, analyze the return acoustic signal to estimate a location of a gap in the casing support material, analyze the radiation signal to estimate a concentration of a constituent of the casing support material, and identify whether the gap is a defective portion in the casing support material based on the concentration of the constituent at the location.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for evaluating borehole casing materials are described herein. The apparatuses and methods include the utilization of acoustic cement evaluation techniques in combination with neutron measurements to estimate properties of borehole casing materials and/or evaluate the integrity of a borehole casing assembly. In one embodiment, the apparatuses and methods combine acoustic and neutron measurements to detect gaps, voids or other significant weaknesses or defective portions in borehole casing support and/or bonding materials, such as cement.

Figure 1:
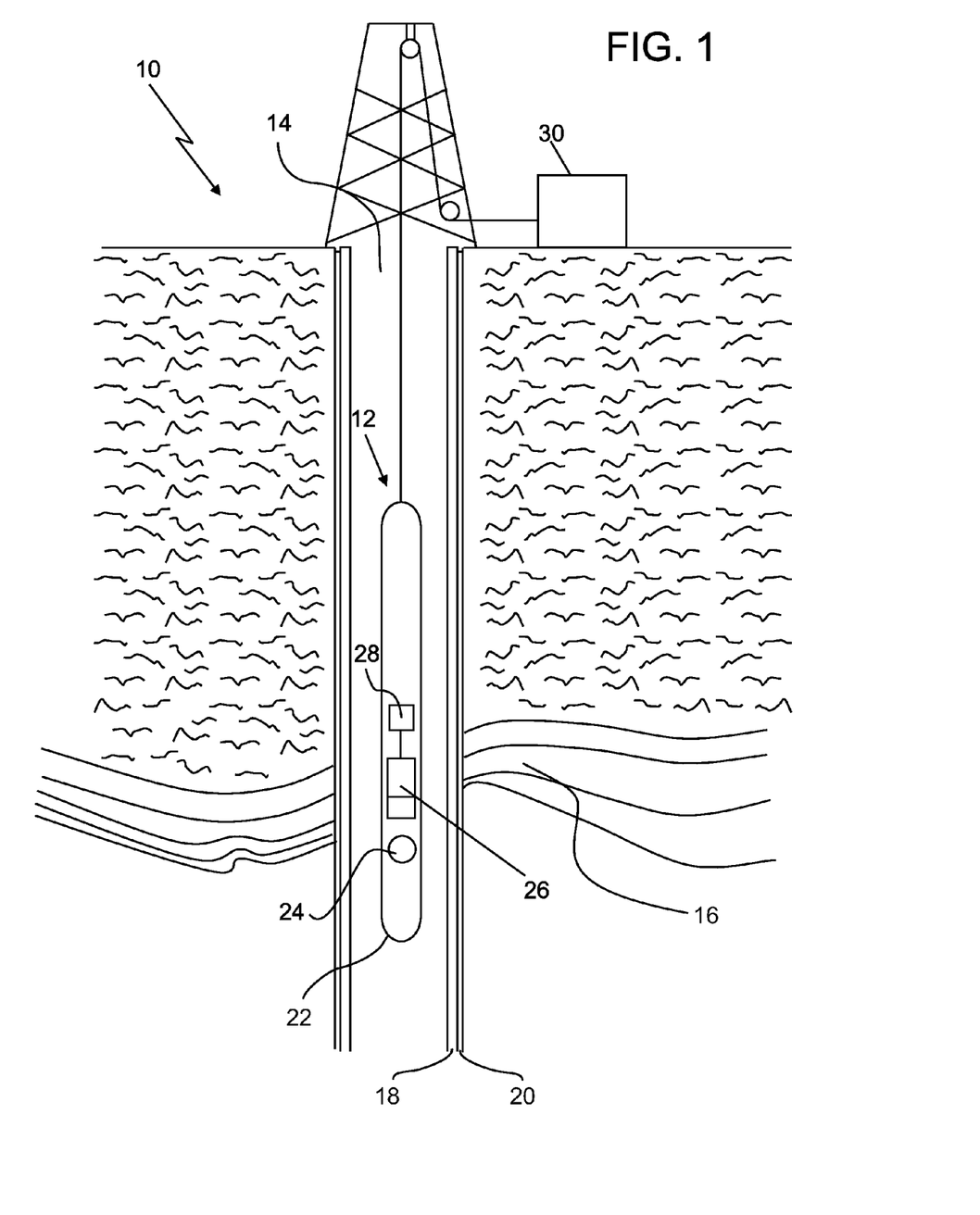
FIG. 1 is a side cross-sectional view of an embodiment of a subterranean well drilling, evaluation, exploration and/or production system.

Referring to FIG. 1, an exemplary embodiment of a subterranean well drilling, evaluation, exploration and/or production system 10 includes a borehole string 12 that is shown disposed in a borehole 14 that penetrates at least one earth formation 16 during a subterranean operation. As described herein, a "formation" refers to the various features and materials that may be encountered in a subsurface environment and surround the borehole 14. A casing 18 a disposed in the borehole 14 and is cemented or bonded to the borehole wall via a casing support material such as cement 20 that includes any suitable cementing or other material sufficient to bond the casing 18 to the borehole wall, facilitate the casing in supporting and/or isolating portions of the borehole 14, or otherwise support the casing. In one embodiment, the casing support material is a cement material that includes silicon.

The casing 18 is made from any material suitable for withstanding downhole conditions such as pressure, temperature and chemical action. Examples of such materials include steel, heat treated carbon steel, stainless steel, aluminum, titanium, fiberglass and other materials. In one embodiment, the casing 18 includes a plurality of pipe segments or casing joints connected together via threaded joints or other connection mechanisms. The casing 18 may extend any length of the borehole. For example, the borehole 14 may include a full casing extending from a surface or near surface location to a selected depth or a liner such as a production liner that is suspended in the borehole 14. The cement 20 includes a material or mixture that is forced into a space between the casing 18 and the borehole 14 and serves to bond the casing 18 to the borehole wall.

In one embodiment, the borehole string 12 includes a downhole tool 22 such as a well logging tool. In one embodiment, the downhole tool 22 is configured as a casing/cement evaluation tool. The downhole tool 22 is shown in FIG. 1 as a wireline tool, but is not limited thereto, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

The downhole tool 22, in one embodiment, is configured as a neutron measurement tool and/or an acoustic interrogation tool. The tool 22 includes at least one interrogation source 24 and at least one detector 26. In one embodiment, electronics 28 are also included for storing, transmitting and/or processing signals and/or data generated by the at least one detector 26. The number of sources 24 and detectors 26 is not limited.

In one embodiment, the at least one source 24 is at least one acoustic source and the at least one detector 26 is at least one acoustic detector. In another embodiment, the at least one source 24 is at least one neutron source and the at least one detector 26 is at least one radiation detector such as a gamma ray and/or neutron detector. In another embodiment, the tool 22 includes sensors and detectors for interrogating the casing 18, the cement 20 and/or the formation 16 with both acoustic signals and neutron flux emissions.

In one embodiment, the tool 22 is equipped with transmission equipment to communicate ultimately to a surface processing unit 30. Such transmission equipment may take any desired form, and different transmission media and methods may be used. Examples of connections include wired, fiber optic, wireless connections and memory based systems.

Figure 2:
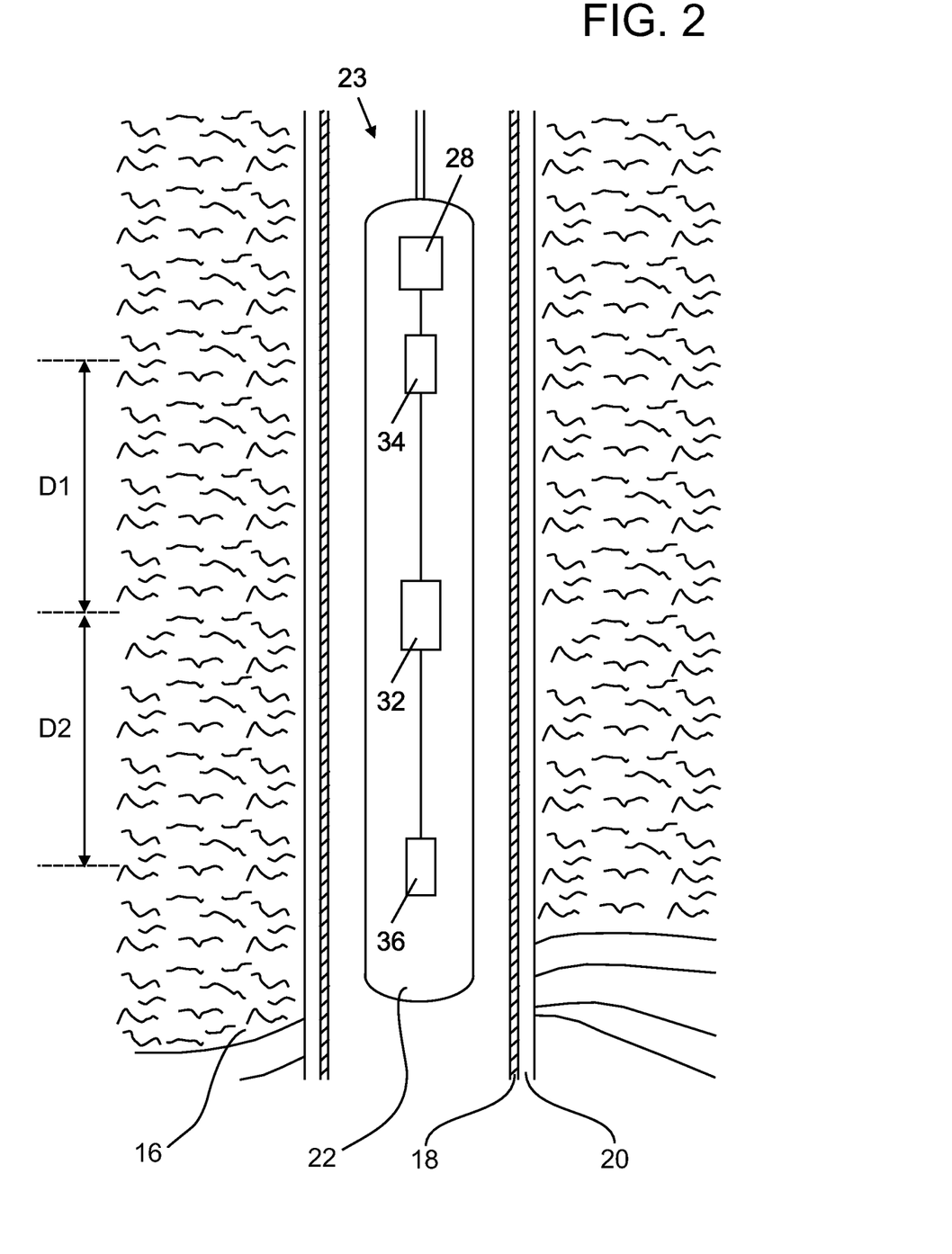
FIG. 2 is a side cross-sectional view of an embodiment of a downhole tool for evaluation of a borehole casing via measurement of induced neutron activation signals.

FIG. 2 illustrates an exemplary embodiment of the tool 22, in which the tool 22 is configured as a neutron measurement tool 23. In this embodiment, the at least one interrogation source 24 includes at least one neutron source 32 and the at least one detector 26 includes one or more gamma ray detectors 34, 36. The neutron source 32 is configured to emit high energy neutrons (i.e., a neutron flux) at selected borehole locations over selected time periods. The neutron flux may be generated as a pulsed emission. The neutron source may be any suitable device that emits neutrons. Examples of neutron sources include pulsed neutron sources and chemical neutron sources such as americium-beryllium (AmBe) sources. Two of the main interaction mechanisms that are detected by the gamma ray detectors 34, 36, among others, are neutron capture and neutron inelastic scattering which can generate neutron-induced gamma rays.

In one embodiment, the gamma ray detectors 34, 36 are configured to detect gamma ray photons emitted naturally from the borehole 14 and the formation 16, as well as gamma ray photons generated from neutron interactions with nuclei in the borehole 14 and the formation 16. Detecting photons includes counting the photons, measuring the energy of each detected photon, and/or measuring the time of detection with respect to the time of each neutron pulse. Thus, the gamma ray detectors 34, 36 can acquire data that can be used to provide a time spectrum and/or an energy spectrum. In one embodiment, the at least one detector 26 also includes one or more neutron detectors for example, to measure neutron flux to correct detected silicon activation and compensate for changes in neutron output.

In one embodiment, the gamma ray detectors 34, 36 include a first or leading detector 34 located a selected distance "D1" uphole from the neutron source 32 and a second or trailing detector 36 located a selected distance "D2" downhole from the neutron source 32. As described herein, "uphole" refers to a location on the tool 23 that is closer to the surface relative to a reference location when the tool 23 is disposed in the borehole 14. Likewise, "downhole" refers to a location on the tool 23 that is farther from the surface relative to a reference location when the tool 23 is disposed in the borehole 14. In one embodiment, D1 and D2 are at least substantially equal in magnitude, although D1 and D2 may be different. For example, the leading detector 34 and the trailing detector 36 may each be located approximately 10 feet from the neutron source 32. The number and location of the gamma ray detectors 34 and 36 are not limited.

In one embodiment, the leading detector 34 is configured to detect naturally occurring radiation emitted from the formation 16 when the tool 23 is disposed in and/or advanced through the borehole, and the trailing detector 36 is configured to detect radiation emitted from the formation 16 as a result of naturally occurring radiation and interactions between the emitted neutrons and nuclei in the borehole 14 and the formation 16. As described herein, a "leading" position refers to a location in the tool 23 that reaches a reference location before the neutron source 32 as the tool 23 moves through the borehole 14. Likewise, a "trailing" position refers to a location in the tool 23 that reaches a reference location after the neutron source 32 as the tool 23 moves through the borehole 14.

Although the neutron measurement tool 23 shown in FIG. 2 includes multiple detectors, the type and configuration of the neutron tool 23 described herein is not limited. For example, the tool 23 may include only a single detector and the gamma ray measurements may disregard the effect of naturally occurring radiation. In another example, the tool 23 is configured as multiple tools or subs, each having at least one respective source and/or detector disposed therein. The tool 23 may include any number of sources and detectors such as a detector array and/or detectors positioned at multiple radial and/or circumferential locations in or on the tool 23.

Figure 3:
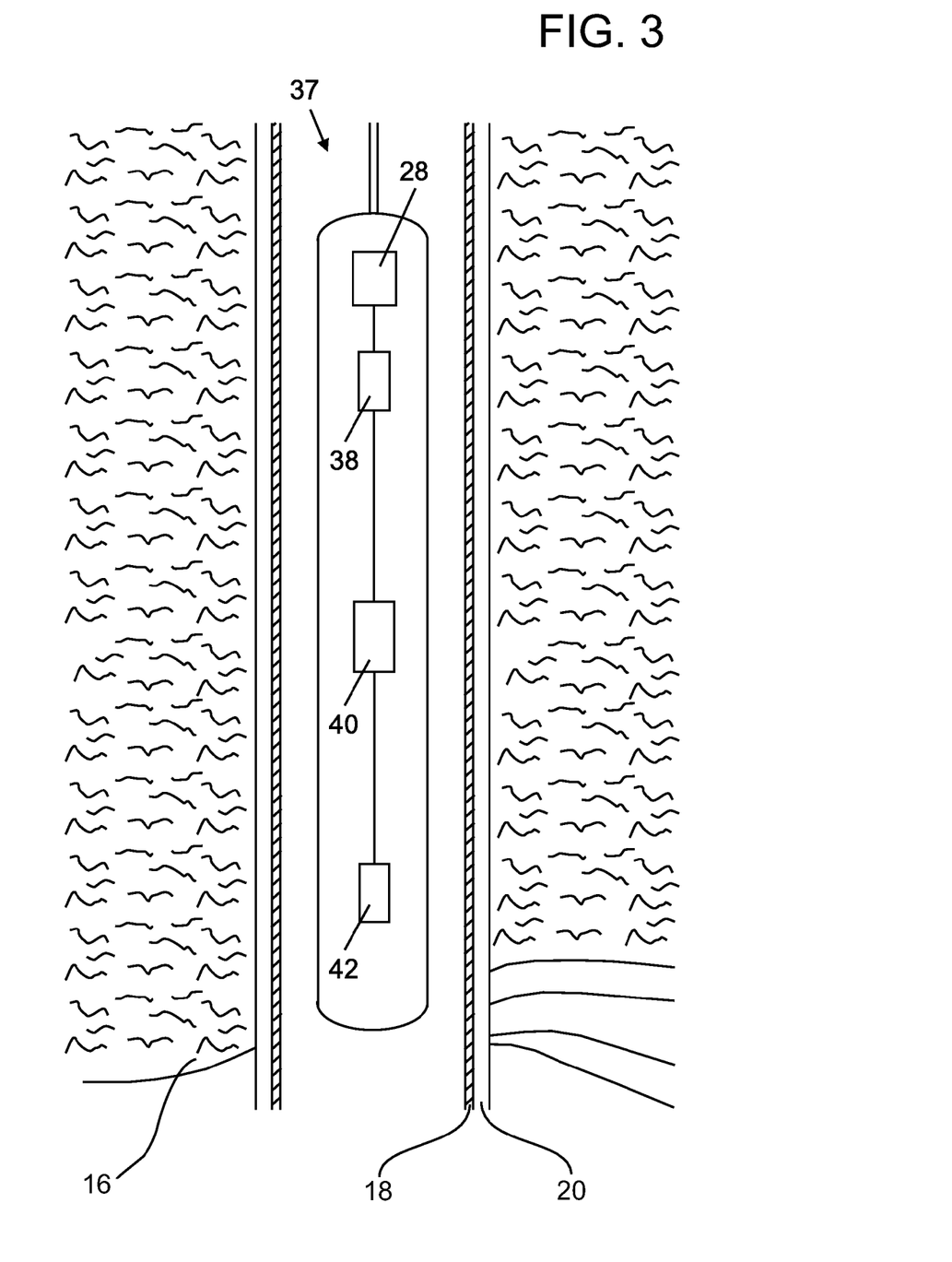
FIG. 3 is a side cross-sectional view of an embodiment of a downhole tool for acoustic evaluation of a borehole casing

Referring to FIG. 3, in one embodiment, the tool 22 is configured as an acoustic measurement tool 37. In one embodiment, the acoustic measurement tool 37 is configured to measure properties of the casing 18 as well as the cement 20. In one embodiment, the acoustic measurement tool 37 is configured to measure properties relating to characteristics of the bond between the casing 18 and the cement 20.

The at least one source 24, in this embodiment, is an acoustic source 38 configured to emit sonic or other acoustic waves into the casing 14, the cement 20 and/or the formation 14. Examples of acoustic sources include piezoelectric devices, electromagnetic acoustic transmitters, pulsed laser devices, flexural resonators, wedge transducers and combinations thereof. The at least one detector 26 is configured as one or more acoustic receivers 40, 42 configured to detect reflected acoustic waves. In the embodiment shown in FIG. 3, two detectors 40, 42 are illustrated. However, any number of detectors 40 may be positioned at various locations in or on the tool 37. For example, an array of detectors may be positioned at multiple locations along the length of the tool and/or at multiple angular locations to affect a two-dimensional or three-dimensional data set.

In one example, illustrated in FIG. 3, the acoustic measurement tool 37 includes a first acoustic detector 40 positioned at a first distance D1 from the acoustic source 38 and a second acoustic detector 42 positioned at a second greater distance D2 from the acoustic source 38. Exemplary distances for D1 and D2 are 3 feet and 5 feet, respectively. The first acoustic detector 40 may be configured to detect reflected wave amplitudes generally corresponding to an area proximate to an interface between the casing 18 and the cement 20 (i.e., the "casing/cement bond"), and the second acoustic detector 42 may be configured to detect reflected waves generally corresponding to an area proximate to an interface between the cement 20 and the formation 14 (i.e., the "cement/formation bond").

Figure 4:
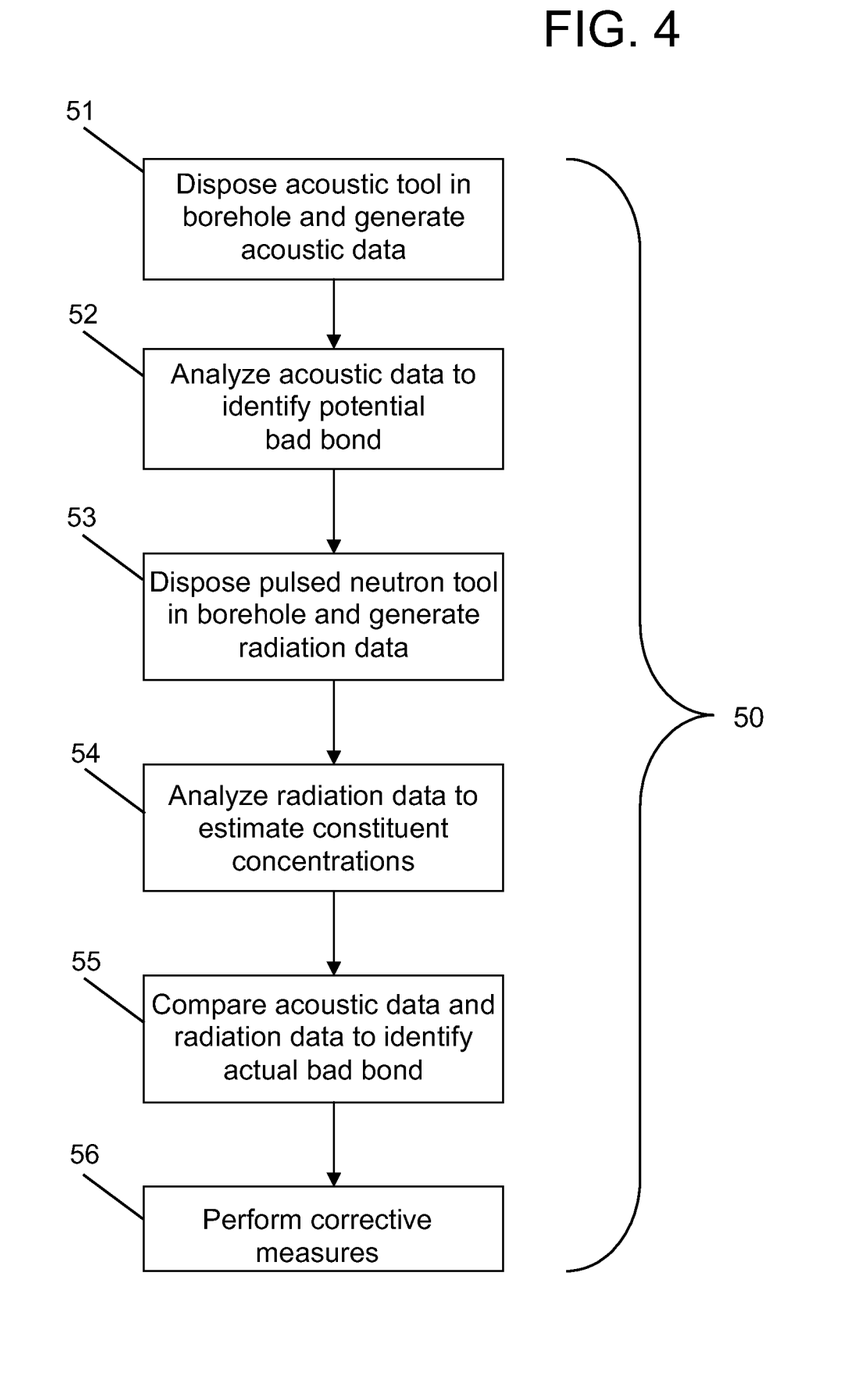
FIG. 4 is a flow chart providing an exemplary method of evaluating a cased borehole in an earth formation.

FIG. 4 illustrates a method 50 of evaluating a cased borehole. The method may be used to identify characteristics of the cement 20 and/or evaluate the integrity of the bond between the casing 18 and the cement 20. In one embodiment, the method 50 is a method of identifying characteristics of the cement 20. Such characteristics may include or be indicative of voids and other defective portions of the cement, such as areas of separation or detachment between the casing 18 and the cement 20 that are significant enough to allow the flow of downhole fluids therethrough and compromise a hydraulic seal formed between the casing 18 and the cement 20. In one embodiment, "defective portions" refer to those portions of the cement 20 that include areas of separation between the casing 18 and the cement 20, areas of reduced cement thickness or other features that allow fluid flow therethrough. Such defective portions can compromise the integrity of production zones formed in the borehole 14 by the casing 18. Other characteristics include the type and/or amount of constituent materials (e.g., silicon) in the cement.

The method 50 may be performed in conjunction with the system 10, the neutron tool 23, the acoustic tool 37 and/or a tool 22 or downhole assembly include both acoustic and neutron measurement capabilities, but is not limited thereto. The method 50 may be used in conjunction with any apparatus or configuration capable of taking neutron/gamma ray and acoustic measurements. The method 50 includes one or more stages 51-56. In one embodiment, the method 50 includes the execution of all of the stages 51-56 in the order described. However, certain stages may be omitted, stages may be added, or the order of the stages changed.

In one embodiment, the taking of measurements with the neutron tool 23 (that includes a neutron source such as a pulsed neutron or chemical source), the acoustic tool 37 and/or other tools is recorded in relation to the depth and/or position of the tool 22, which is referred to as "logging", and a record of such measurements is referred to as a "log". Exemplary logs include a cement bond log (CBL) generated by the acoustic tool 37 and a neutron log generated by the neutron tool 23. Additional examples of logging processes include logging measurements after drilling, wireline logging, pipe-conveyed logging operations, drop shot logging and memory logging. The data retrieved during these processes may be transmitted to the surface such as to the surface processing unit 30, and may also be stored with the tool (via, for example, the electronics 28) for later retrieval.

In the first stage 51, an acoustic measurement tool such as the acoustic tool 37 is disposed in the borehole 14. In one embodiment, the acoustic tool 37 is lowered into the borehole 14 via a wireline, although the acoustic tool 37 can be lowered via any suitable mechanism.

The acoustic source 38 is activated and an acoustic signal is emitted at least into the casing 18 and the cement 20. The acoustic waves emitted as part of the acoustic signal travel through the casing 18, the casing/cement bond, the cement 20, the cement/formation bond and/or the formation 14. Examples of acoustic waves include ultrasonic waves such as a Lamb wave and shear horizontal waves, compression waves and P waves.

One or more receivers 40, 42 detect waves reflected from various locations in the borehole 14 and/or the formation 16 as acoustic return signals. Such locations include, for example, the casing/cement bond and the cement/formation bond. These events may be recorded as acoustic data in the form of, for example, wave spectrums having various patterns.

In the second stage 52, the acoustic return signals are analyzed to determine parameters as well as the condition of the cement and/or the cement/casing bond. This analysis may include recording the return signals over time and correlating them to depth as well as processing the associated data to yield a log (e.g., a CBL) or other measurement record. Examples of useful data include the time and amplitude of both emitted and recorded waves, signal amplitude and time lag values. In addition, wave attenuation as the wave propagates through the casing 18 and the cement 20 may be recorded.

For example, the amplitudes and/or attenuations of received acoustic signals are compared at different locations and/or at locations corresponding to multiple receivers in an array. Increases in attenuation recorded indicate some type of inconsistency, which may be considered a possible indication of a significant void or other defective portion in the cement. Such an inconsistency, such as a microannulus, may be indicative of a significant defective portion, or may merely represent an inconsequential feature of the cement.

For example, a large return signal amplitude recorded by a receiver 40, 42 is identified as indicating a gap such as a microannulus between the casing 18 and the cement 20 and/or between the cement 20 and the formation 14. This gap may be an indicator of a potential defective portion or "bad bond" in the cement 20 that may compromise the casing/cement bond. A small signal amplitude is identified as indicating that no gap exists and thus is an indicator of a "good bond" between the casing 18 and the cement 20.

Identification of the gap includes, in one embodiment, comparison of the acoustic return signal with a reference value. For example, a reference attenuation and/or amplitude value is selected that indicates a value at or above which indicates a gap or potential bad bond. This reference value may be selected from an amplitude and/or attenuation value known to indicate a good bond based on prior measurements or an average amplitude and/or attenuation estimated from an acoustic log.

In the third stage 53, a neutron tool 23 such as a pulsed neutron or chemical source tool is disposed in the borehole 14, and the neutron source 32 is activated to emit high energy neutrons into the casing 18, the cement 20 and/or the formation 14. The radiation detectors 34, 36 detect radiation including gamma rays emitted from the casing 18, the cement 20 and/or the formation 14. In one embodiment, one or more measurements are taken for each of a plurality of borehole locations and/or depths to generate a neutron log. Activation and detection are accomplished at multiple depths, and may be performed while the neutron tool 23 is in motion, e.g., is being pulled uphole through a selected section of the borehole 14 at a selected speed. An exemplary logging speed is 10 ft/min in the uphole direction for the exemplary spacing D1 of 10 feet with the neutron source 32 leading at least one detector 34, 36. As described herein, "neutron measurements" and "neutron logs" refer to measurements of radiation that includes radiation resulting from the interaction of emitted neutrons with elements in the borehole and/or formation.

In one embodiment, the leading gamma ray detector 34 detects natural gamma radiation from constituent materials such as silicon, potassium, uranium and thorium. The trailing detector 36 detects gamma rays that include the natural radiation as well as gamma rays resulting from interactions between the emitted neutrons and nuclei (such as silicon nuclei in the cement and the formation) in the casing 18, the cement 20 and/or the formation 16.

In the fourth stage 54, gamma ray signals detected by the trailing detector 36 are analyzed to generate inelastic, thermal neutron capture, and/or neutron activation gamma ray spectra. The spectra are analyzed, for example, by counting gamma rays in windows placed at the main peaks for the elements concerned, or by comparison with known standards, or by combining the two.

In one embodiment, the concentration of one or more elements, such as oxygen and silicon, are determined via measured neutron activation gamma radiation count rates recorded by the gamma ray detectors 34, 36. For example, concentrations of elements are identified by recording the radiation count rate (e.g., in American Petroleum Institute (API) units) which varies with the half-life of the elements. In one embodiment, a silicon activation gamma ray count rate (i.e., an amount of gamma rays generated due to silicon activation by neutrons, referred to herein as a "silicon activation count rate") is generated indicating a concentration of silicon in the cement 20 and/or the formation 16, corresponding to a number of depths and/or locations in the borehole 14. A silicon activation count rate record or log may be constructed. Although the analysis described herein relates to measurement of silicon concentration, the analysis may relate to any number of measurements, such as concentrations of elements including iron, oxygen, and any other element capable of being activated by fast neutrons.

In one embodiment, the silicon activation count rate is generated by comparing the natural radioactivity count rate (i.e., leading count rate) detected by the leading detector 34 with the natural radioactivity plus silicon count rate (i.e., trailing count rate) detected by the trailing detector 36. For example, the leading count rate is subtracted from the trailing count rate to generate a count rate indicative of the silica behind the casing 18 in the cement 20 and the formation 16. The silicon count rate can be attributed to the cement-filled annulus with formation silica adding additional counts. In another embodiment, the leading detector is excluded, and the silicon activation count rate is generated without accounting for natural radioactivity.

The silicon activation count rate is proportional to the volume of cement in the annulus between the casing 18 and the formation 16 at a measurement depth, and may also be proportional to the amount of silicon in the formation 16. Variations in the amount of silicon are recorded by comparison with a reference value or level such as a reference or base count rate. The reference count rate may be any selected rate considered to be related to a cement volume, or may be based on the measured silicon activation count rate. For example, the reference count rate is an average of the silicon activation count rates measured at various depths along the borehole 14. For example, the silicon activation count rate measured for various depths may be in the range of between zero and about 1000 API units. A potentially significant drop in the count rate, i.e., a potential void, may be on the order of about 100 API units.

Although stages 51 and 53 are described as being performed separately, for example, in separate logging runs, the stages 51 and 53 may be performed as a single step. For example, the borehole string 12 may include both acoustic and neutron tools, and acoustic and neutron measurements are performed during the same logging run. In another example, neutron and acoustic measurements may be collected via a single downhole tool 22 configured to take both neutron and acoustic measurements.

In the fifth stage 55, measurements from the neutron tool 23 and the acoustic tool 37 are compared to evaluate the casing 18 and/or the cement 20. For example, a cement bond log is compared to a silicon activation count rate log to identify defective portions or bad bonds in the cement 20.

In one embodiment, evaluation includes identifying locations of potential bad bonds from the cement bond log (CBL). A silicon activation count rate log is then used to identify the measured silicon concentration at identified locations corresponding to the potential bad bond locations from the CBL. Inspection of the silicon concentration measurements at the identified locations can be used to determine whether the potential bad bond indication is a microannulus (a minimal gap that does not have a significant effect on the casing/cement integrity) or is truly a void or other defective portion in the cement 20.

The silicon activation count rates at the identified locations are analyzed to determine whether a significant deviation in the silicon activation count rate occurred at that location, which would indicate the presence of a defective portion. In one embodiment, a significant deviation is selected as a drop in the silicon activation count rate to a level below a base or reference level, such as an average silicon activation count value. If the silicon activation count rate at an identified location exhibits a significant deviation, the change in composition at that location is considered to be indicative of a void in the cement behind the casing, in contrast to simply a microannulus.

Alternatively, if the silicon activation count rate is within a selected range from the reference level, the "potential" bad bond is considered to be only a microannulus or other insignificant feature, which does not require any mediation or corrective measure.

In the sixth stage 56, if a bad bond or void is identified, corrective measures are employed to repair the bad bond. Examples of such corrective measures include conventional remedial cementing such as squeeze cementing.

Figure 5A:
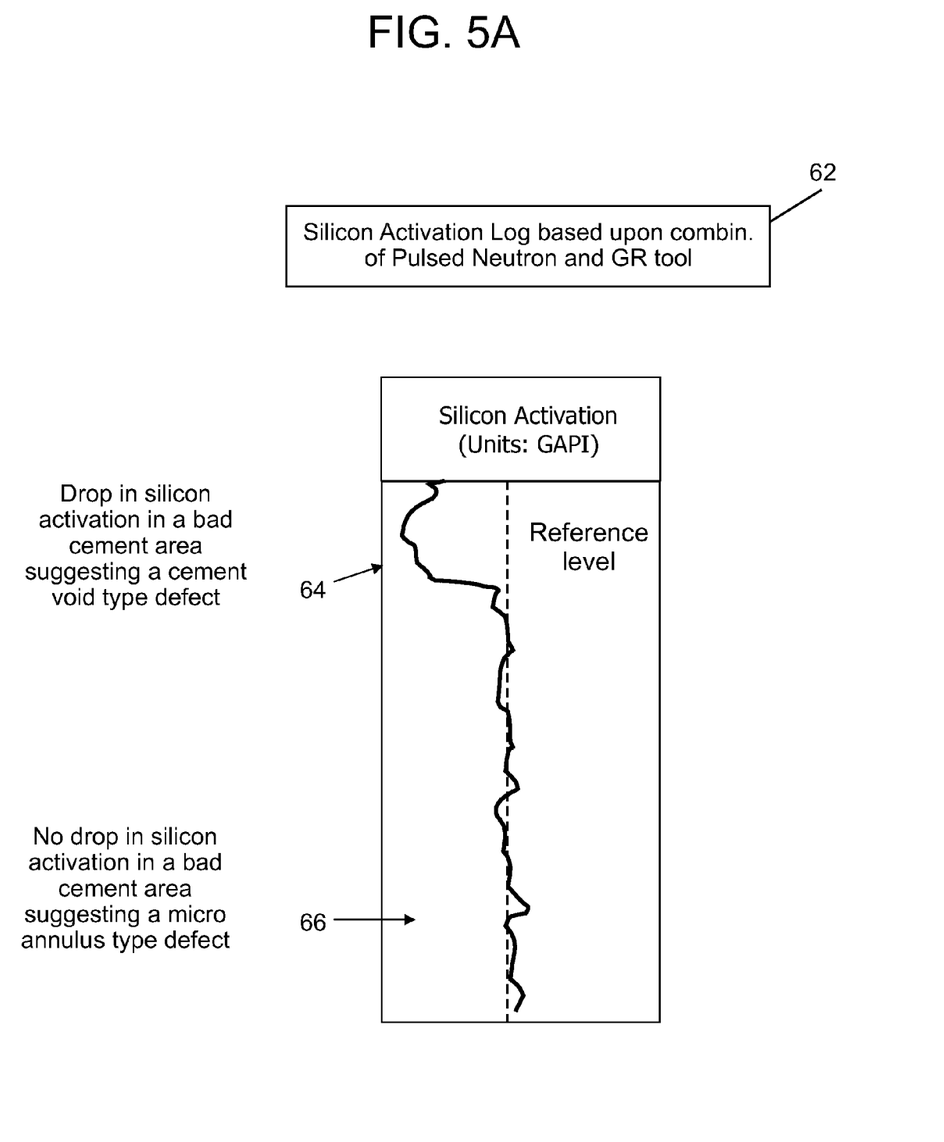
FIGS. 5A and 5B are illustrations of an exemplary pulsed neutron log and an exemplary cement bond log, respectively, generated in conjunction with the method of FIG. 4.
Figure 5B:
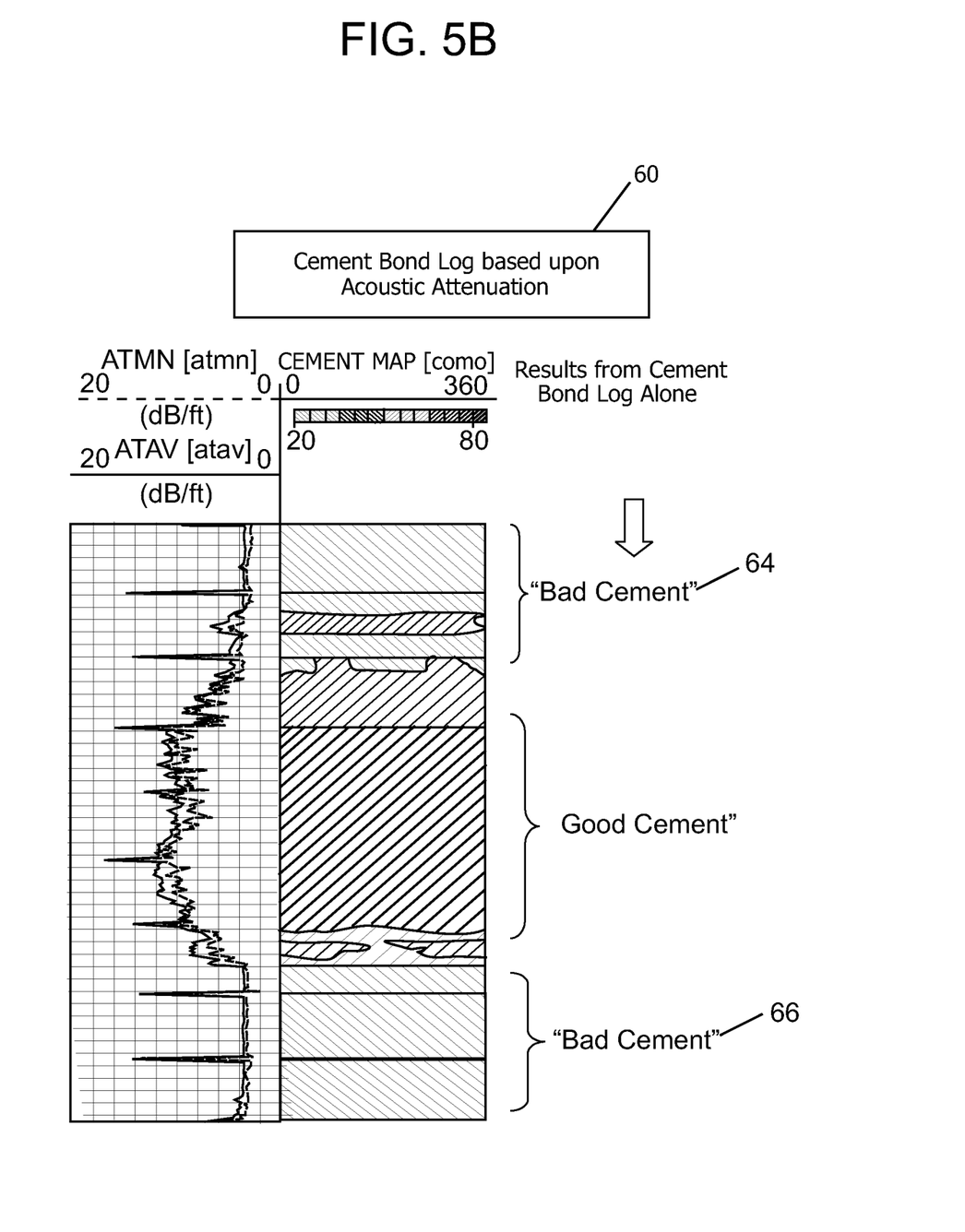

FIGS. 5A and 5B illustrate an example of an acoustic log 60 and a pulsed neutron log 62 that may be utilized in the method 50. The acoustic log 60 in this example is a CBL showing acoustic attenuation values. Regions 64 and 66 are shown in the acoustic log 60 as being potential bad bonds, due to a drop in the attenuation in these regions. Comparison of the silicon activation counts from the pulsed neutron log 62 at locations corresponding to regions 64 and 66 shows a drop in the silicon activation count only in the region 64, and thus only the region 64 is identified as a defective portion. Thus, utilization of both the acoustic log 60 and the pulsed neutron log 62 as described in the methods above provides a more accurate identification of actual defective cement portions.

The apparatuses and methods described herein have various advantages over prior art apparatuses and techniques. The apparatuses and methods allow for accurate detection of bad bonds in cased boreholes, and also allow for effective differentiation between microannuluses that do not significantly affect the integrity of the casing/cement bond from voids or thin cement areas that compromise hydraulic stability. In addition, the apparatuses and methods described herein eliminate the need to employ unnecessary remediation measures in casing regions that may have hydraulically insignificant microannuluses.

Furthermore, the apparatuses and methods provide a simplified technique for detecting bad bonds. For example, some prior art methods for identifying bad bonds include performing a first acoustic logging run in a borehole at a first hydrostatic pressure, followed by introducing additional fluid into the borehole at a second greater hydrostatic pressure sufficient to apply pressure and reduce or eliminate microannuluses or other gaps in the cement. A second acoustic logging run is performed while the borehole is under the second hydrostatic pressure. The signals for the first and second logging runs are compared to identify microannulus or other inconsistency locations that show a significant improvement in signal amplitude between corresponding first and second acoustic signals. The apparatuses and methods described herein do not require such pressurization techniques to identify bad bonds.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A method of evaluating a cased borehole in an earth formation, comprising:
    emitting at least one acoustic signal into the borehole via an acoustic source and detecting a return acoustic signal via an acoustic sensor, the borehole including a casing and a casing support material disposed between the casing and a borehole wall, the at least one acoustic signal configured to indicate a location of a gap in the casing support material, the gap being one of: an annulus formed between the casing and the borehole wall that is insignificant relative to the integrity of a hydraulic seal formed between the casing and the casing support material, and a void that can compromise the integrity of the hydraulic seal;
    emitting a neutron flux via a neutron source into the borehole and detecting a radiation signal via a radiation detector, the radiation signal including induced gamma radiation resulting from neutron interactions and indicating characteristics of constituent materials in the casing support material; and
    identifying whether the gap in the casing support material is an annulus that is insignificant relative to the integrity of the hydraulic seal, or whether the gap is a void that can compromise the integrity of the hydraulic seal, based on the return acoustic signal and the radiation signal.

2. The method of claim 1, wherein the characteristic is indicative of a defective portion of the casing material support portion.

3. The method of claim 1, wherein identifying the characteristic includes:
    analyzing the return acoustic signal to estimate a location of a gap in the casing support material;
    analyzing the radiation signal to estimate a concentration of a constituent of the casing support material; and
    identifying whether the gap is a void in the casing support based on the concentration of the constituent at the location.

4. The method of claim 3, wherein analyzing the return acoustic signal includes calculating at least one of an amplitude and an attenuation of the return acoustic signal and correlating the at least one of the amplitude and the attenuation to a location in the borehole.

5. The method of claim 4, wherein analyzing the return acoustic signal includes comparing the at least one of the amplitude and the attenuation to a reference value.

6. The method of claim 5, wherein analyzing the return acoustic signal includes identifying the gap if the at least one of the amplitude and the attenuation is greater than the reference value.

7. The method of claim 3, wherein the radiation includes natural gamma radiation, and evaluating the radiation signal includes subtracting the natural gamma radiation from the induced gamma radiation.

8. The method of claim 3, wherein the constituent is selected from at least one of silicon, oxygen, iron, and any element capable of being activated by fast neutrons.

9. The method of claim 3, wherein identifying whether the gap is a void includes:
   determining that the gap is not a void if the concentration of the constituent is equal to or greater than a reference value at the location; and
   determining that the gap is a void if the concentration of the constituent is less than a reference value at the location.

10. The method of claim 9, wherein the neutron flux is emitted and the radiation signal is detected at a plurality of locations, and the reference value is an average constituent concentration over the plurality of locations.

11. The method of claim 3, wherein analyzing the radiation signal includes measuring a radiation count corresponding to a selected constituent and correlating the radiation count to a location in the borehole.

12. The method of claim 3, wherein the location is at least one of a borehole depth and a circumferential borehole location.

13. The method of claim 1, wherein the casing support material is a cement material.

14. A method of evaluating a cased borehole in an earth formation, comprising:
   disposing an acoustic measurement device in the cased borehole, the borehole including a casing and a casing support material disposed between the casing and a borehole wall, the acoustic measurement device including at least one acoustic source and at least one acoustic receiver;
   emitting an acoustic signal into the borehole at a plurality of locations and detecting a return acoustic signal at each of the plurality of locations;
   generating an acoustic log that includes a plurality of return signal amplitudes, each return signal amplitude correlated with a respective location;
   identifying a location of a gap in the casing support material by comparing at least one of an amplitude and an attenuation of each return signal amplitude to a reference value, the gap being one of: an annulus formed between the casing and the borehole wall that is insignificant relative to the integrity of a hydraulic seal formed between the casing and the casing support material, and a void that can compromise the integrity of the hydraulic seal;
   disposing a neutron measurement device in the cased borehole, the neutron measurement device including at least one neutron source and at least one gamma ray detector;
   emitting a neutron flux into the borehole at the plurality of locations and detecting a radiation signal at each of the plurality of locations, the radiation signal including induced gamma radiation resulting from neutron interactions;
   generating a neutron log that includes a plurality of radiation counts, each radiation count corresponding to a constituent concentration at each of the plurality of locations;
   determining the radiation count at the gap location and comparing the radiation count at the gap location to a reference radiation count; and
   identifying based on the comparison whether the gap is an annulus formed between the casing and the borehole wall that is insignificant relative to the integrity of the hydraulic seal formed between the casing and the casing support material, or whether the gap is a void that can compromise the hydraulic seal.

15. The method of claim 14, wherein the constituent is silicon.

16. The method of claim 14, wherein the reference radiation count is an average radiation count over the plurality of locations.

17. An apparatus for evaluating a cased borehole in an earth formation, comprising:
   an acoustic measurement device configured to be disposed in the cased borehole and including at least one acoustic source configured to emit at least one acoustic signal into the borehole and at least one acoustic sensor configured to detect a return acoustic signal, the borehole including a casing and a casing support material disposed between the casing and a borehole wall;
   a neutron measurement device configured to be disposed in the cased borehole and including at least one neutron source configured to emit a neutron flux into the borehole and at least one radiation detector configured to detect a radiation signal, the radiation signal including induced gamma radiation resulting from neutron interactions; and
   at least one processor configured to receive the at least one return acoustic signal, analyze the return acoustic signal to estimate a location of a gap in the casing support material, the gap being one of: an annulus formed between the casing and the borehole wall that is insignificant relative to the integrity of a hydraulic seal formed between the casing and the casing support material, and a void that can compromise the integrity of the hydraulic seal, analyze the radiation signal to estimate a concentration of a constituent of the casing support material, and identify based on the radiation signal whether the gap is an annulus formed between the casing and the borehole wall that is insignificant relative to the integrity of the hydraulic seal formed between the casing and the casing support material, or whether the gap is a void that can compromise the hydraulic seal.

18. The apparatus of claim 17, wherein the at least one radiation detector includes a leading detector configured to detect a natural radiation signal including natural gamma radiation, and a trailing detector configured to detect an induced neutron activation signal that includes both natural gamma radiation and induced gamma radiation.

19. apparatus of claim 18, wherein the at least one processor is configured to estimate the concentration of the constituent by comparing the natural radiation signal and the neutron induced neutron activation signal.

20. The apparatus of claim 17, wherein the acoustic measurement device and the neutron measurement device are incorporated in a single carrier.

* * * * *